(12) United States Patent
Ellis et al.

(10) Patent No.: US 9,022,735 B2
(45) Date of Patent: May 5, 2015

(54) TURBOMACHINE COMPONENT AND METHOD OF CONNECTING COOLING CIRCUITS OF A TURBOMACHINE COMPONENT

(75) Inventors: Scott Edmond Ellis, Easley, SC (US); Aaron Ezekiel Smith, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 699 days.

(21) Appl. No.: 13/291,759

(22) Filed: Nov. 8, 2011

(65) Prior Publication Data

US 2013/0115090 A1 May 9, 2013

(51) Int. Cl.
*F01D 5/18* (2006.01)
*F02C 7/12* (2006.01)
*F01D 5/08* (2006.01)

(52) U.S. Cl.
CPC .............. *F02C 7/12* (2013.01); *Y10T 29/49321* (2015.01); *F01D 5/18* (2013.01); *F01D 5/081* (2013.01); *F05D 2240/81* (2013.01)

(58) Field of Classification Search
None
See application file for complete search history.

(56) References Cited

U.S. PATENT DOCUMENTS

| | | | |
|---|---|---|---|
| 4,017,213 A | 4/1977 | Przirembel | |
| 5,340,278 A | 8/1994 | Magowan | |
| 5,344,283 A | 9/1994 | Magowan et al. | |
| 5,382,135 A | 1/1995 | Green | |
| 5,639,216 A | 6/1997 | McLaurin et al. | |
| 5,813,835 A | 9/1998 | Corsmeier et al. | |
| 5,848,876 A | 12/1998 | Tomita | |
| 5,915,923 A | 6/1999 | Tomita et al. | |
| 6,019,579 A | 2/2000 | Fukuno et al. | |
| 6,065,931 A | 5/2000 | Suenaga et al. | |
| 6,071,075 A | 6/2000 | Tomita et al. | |
| 6,079,946 A | 6/2000 | Suenaga et al. | |
| 6,092,991 A | 7/2000 | Tomita et al. | |
| 6,120,249 A | 9/2000 | Hultgren et al. | |
| 6,132,173 A | 10/2000 | Tomita et al. | |
| 6,190,130 B1 | 2/2001 | Fukue et al. | |
| 6,196,799 B1 | 3/2001 | Fukue et al. | |
| 6,210,111 B1 | 4/2001 | Liang | |
| 6,309,175 B1 | 10/2001 | Hahnle et al. | |
| 6,390,744 B1 | 5/2002 | Parkins | |
| 6,390,774 B1 * | 5/2002 | Lewis et al. ................. | 416/96 R |
| 6,402,471 B1 | 6/2002 | Demers et al. | |
| 6,416,284 B1 | 7/2002 | Demers et al. | |
| 6,431,833 B2 | 8/2002 | Jones | |
| 6,478,540 B2 | 11/2002 | Abuaf et al. | |
| 6,644,920 B2 | 11/2003 | Beeck et al. | |
| 6,945,479 B2 | 9/2005 | Boehland et al. | |
| 7,097,424 B2 | 8/2006 | Cunha et al. | |
| 7,131,817 B2 | 11/2006 | Keith et al. | |
| 7,144,215 B2 | 12/2006 | Keith et al. | |
| 7,147,439 B2 | 12/2006 | Jacala et al. | |

(Continued)

FOREIGN PATENT DOCUMENTS

JP 02011801 A * 1/1990

*Primary Examiner* — Richard Edgar
(74) *Attorney, Agent, or Firm* — Cantor Colburn LLP

(57) ABSTRACT

A turbomachine component is provided and includes a turbine blade, which is rotatable about a rotor of a turbine for power generation operations and a platform with which the turbine blade is to be assembled. The turbine blade is formed to define a main circuit having an appendage. The platform is formed to define a platform circuit, and a substantially radially extendible pathway configured to be coupled to the appendage and to the platform circuit.

15 Claims, 3 Drawing Sheets

(56) References Cited

U.S. PATENT DOCUMENTS

| | | |
|---|---|---|
| 7,147,440 B2 | 12/2006 | Benjamin et al. |
| 7,186,089 B2 | 3/2007 | Liang |
| 7,198,467 B2 | 4/2007 | Keith et al. |
| 7,255,536 B2 | 8/2007 | Cunha et al. |
| 7,309,212 B2 | 12/2007 | Itzel et al. |
| 7,416,391 B2 | 8/2008 | Veltre et al. |
| 7,600,972 B2 | 10/2009 | Benjamin et al. |
| 7,766,606 B2 | 8/2010 | Liang |
| 7,862,299 B1 | 1/2011 | Liang |
| 7,870,742 B2 | 1/2011 | Lee et al. |
| 7,901,183 B1 | 3/2011 | Liang |
| 7,926,289 B2 | 4/2011 | Lee et al. |
| 7,950,903 B1 | 5/2011 | Liang |
| 7,976,281 B2 * | 7/2011 | Keith et al. ............... 416/193 A |
| 8,025,482 B1 | 9/2011 | Liang |
| 2001/0019696 A1 | 9/2001 | Jones |
| 2006/0056968 A1 | 3/2006 | Jacala et al. |
| 2007/0140848 A1 | 6/2007 | Charbonneau et al. |
| 2007/0189896 A1 | 8/2007 | Itzel et al. |
| 2009/0116953 A1 | 5/2009 | Spangler et al. |
| 2009/0202339 A1 | 8/2009 | Torii et al. |
| 2010/0158700 A1 | 6/2010 | Poon et al. |
| 2010/0322767 A1 | 12/2010 | Nadvit et al. |
| 2011/0223004 A1 | 9/2011 | Lacy et al. |
| 2011/0236206 A1 | 9/2011 | Seely |
| 2012/0034102 A1 * | 2/2012 | Boyer ......................... 416/97 R |
| 2013/0052009 A1 * | 2/2013 | Smith et al. ...................... 416/1 |
| 2013/0115059 A1 * | 5/2013 | Walunj et al. ................. 415/176 |

* cited by examiner

TURBOMACHINE COMPONENT AND METHOD OF CONNECTING COOLING CIRCUITS OF A TURBOMACHINE COMPONENT

BACKGROUND OF THE INVENTION

The subject matter disclosed herein relates to a turbomachine component and to a method of assembling a turbomachine component.

In modern turbomachines, such as gas turbine engines, compressed gas and fuel are mixed and combusted within a combustor to produce high temperature fluids. These high temperature fluids are then transported to a turbine for power generation operations. With the turbine, various stages of turbine blades, which are rotatable about a rotor of the turbine, aerodynamically interact with the high temperature fluids to cause the rotor to rotate. Each turbine blade is connected to a platform and is, at times, exposed to high temperatures and pressures that would tend to cause damage to the turbine blades and the platform if not for the presence of cooling circuits in the turbine blades and the platforms. These cooling circuits are configured to continuously provide a supply of coolant to surfaces of the turbine blades and the platforms whereby temperatures thereof can be maintained within safe ranges.

Often, it is desirable to connect the cooling circuit of a given turbine blade with a cooling circuit of a given platform with which the turbine blade is assembled in order to create a continuous cooling circuit and a pathway through which coolant can flow. Previously, such connections have usually involved circumferentially oriented holes that extend into radial stress fields that generate relatively high stress concentrations and limit design configurations for a platform cooling circuit.

BRIEF DESCRIPTION OF THE INVENTION

According to one aspect of the invention, a turbomachine component is provided and includes a turbine blade, which is rotatable about a rotor of a turbine for power generation operations and a platform with which the turbine blade is to be assembled. The turbine blade is formed to define a main circuit having an appendage. The platform is formed to define a platform circuit, and a substantially radially extendible pathway configured to be coupled to the appendage and to the platform circuit.

According to another aspect of the invention, a turbomachine component is provided and includes a turbine blade, including an airfoil and a root, which is rotatable about a rotor of a turbine for power generation operations and a platform with which the root of the turbine blade is to be assembled. At least the airfoil of the turbine blade is formed to define a main circuit having a plurality of cavities and a circumferentially extending and radially tapered or curved appendage. The platform is formed to define a platform circuit, and a substantially radially extendible pathway configured to be coupled to an end of the appendage and any one or more of the plurality of the cavities of the platform circuit.

According to yet another aspect of the invention, a method of connecting circuits of a turbomachine component is provided and includes forming a turbine blade, which is rotatable about a rotor of a turbine for power generation operations, such that the turbine blade defines a main circuit having an appendage, forming a platform with which the turbine blade is to be assembled such that the platform defines a platform circuit and machining a substantially radially extendible pathway into the platform such that the pathway is configured to connect the main circuit and the platform circuit when the turbine blade is assembled with the platform.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects, independent cooling passages for turbine blades and platforms may be connected after casting processes are completed. The connections may reduce stress concentration that typically occur and may be formed by way of an externally accessible method allowing for verification of successful passage connection and ease of machining. At least partially due to the cooling passages being independent from one another, the connection process may be simplified and flexible in terms of connection location.

Figure 1:
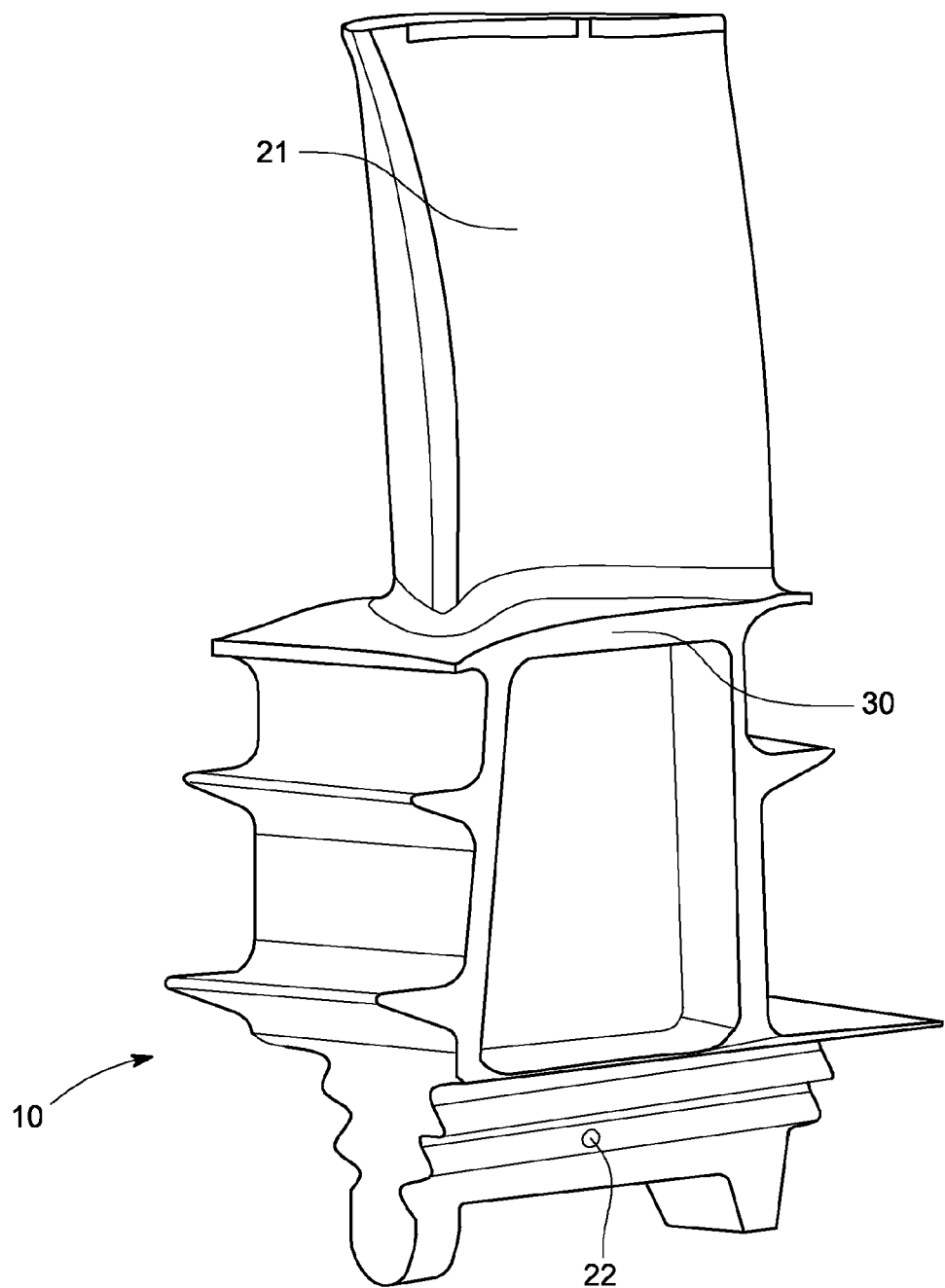
FIG. 1 is a perspective view of a turbomachine component.
Figure 2:
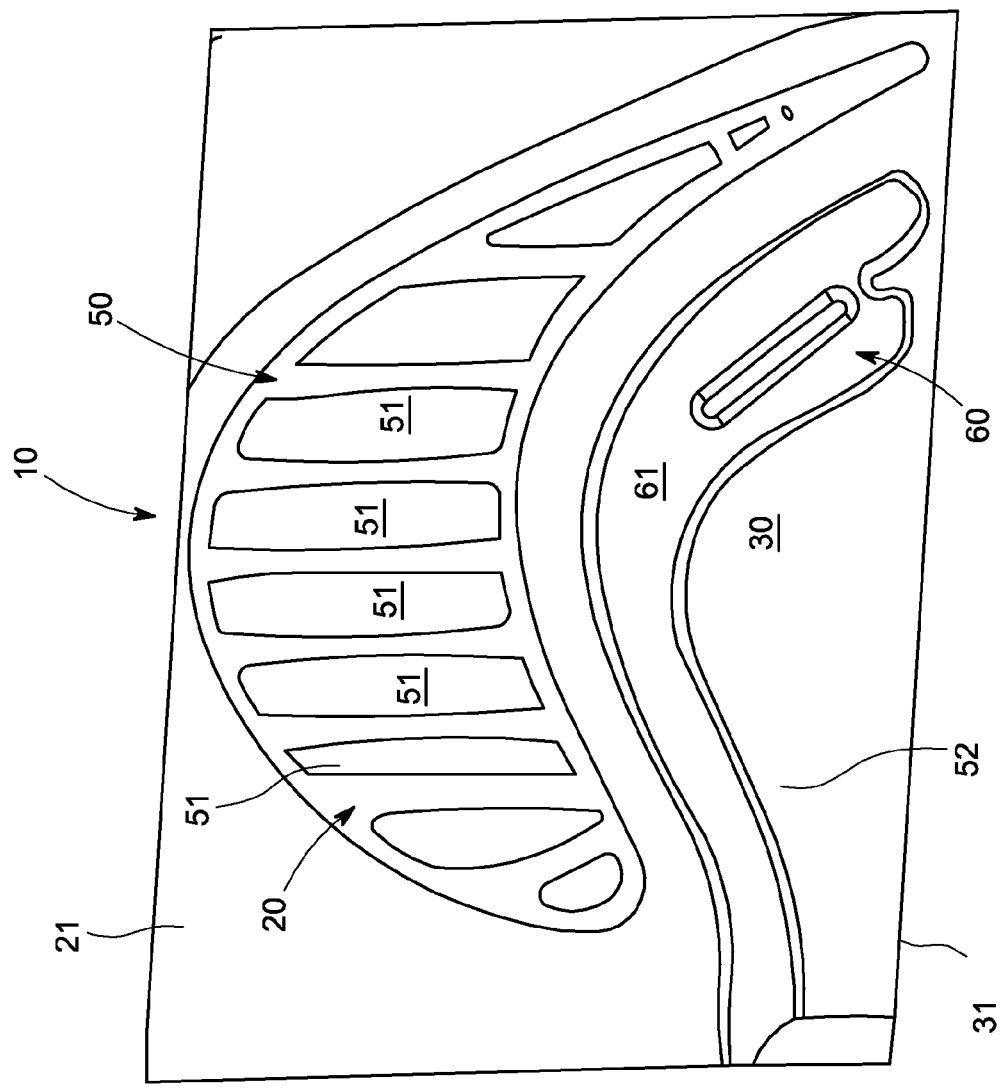
FIG. 2 is a radial view of a turbomachine component in accordance with embodiments.
Figure 3:
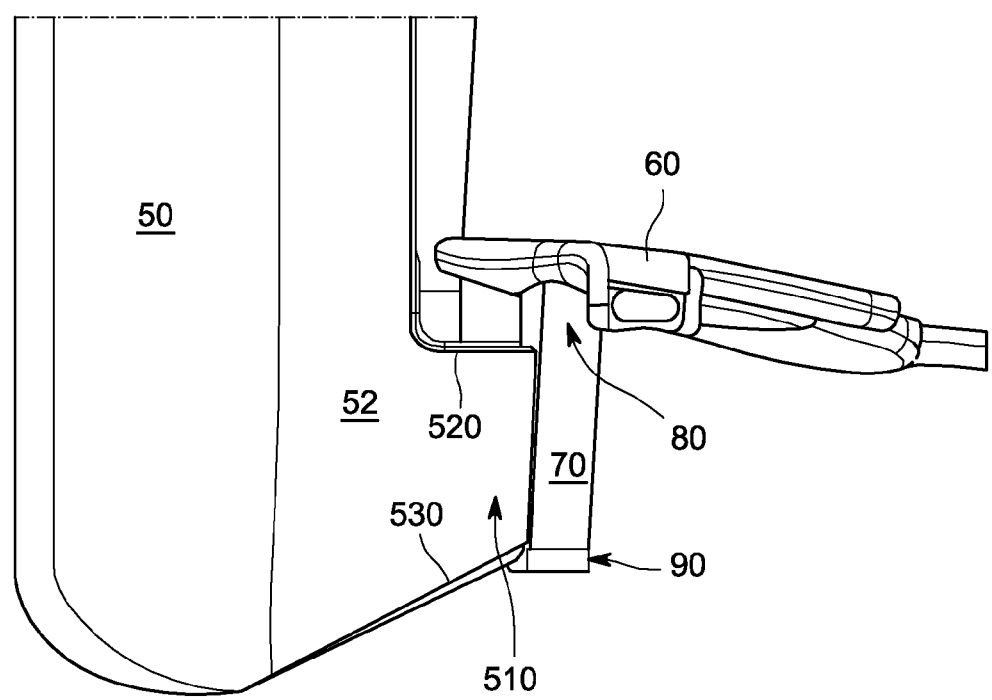
FIG. 3 is an axial view of a main cooling circuit, a platform cooling circuit and a pathway configured to connect the main cooling circuit with the platform cooling circuit in accordance with embodiments.

With reference to FIGS. 1-3, a turbomachine component 10 is provided. The turbomachine component 10 includes a turbine blade 20 and a platform 30. The turbine blade 20 includes an airfoil 21 and a root 22. The airfoil 21 is connected to and is configured to extend radially outwardly from the root 22. The turbine blade 20 is configured to be rotatable about a rotor of, for example, a turbine such that the airfoil 21 interacts with high temperature fluids flowing through the turbine for power generation operations. The platform 30 includes a body 31 and is configured such that the root 22 of the turbine blade 20 may be assembled with the platform 30 such that the turbine blade is retained in a proper position during rotation thereof about the rotor.

At least the airfoil 21 of the turbine blade 20 is formed to define a main cooling circuit 50. In some cases, the root 22 may also be formed to define portions of the main cooling circuit 50. The main cooling circuit 50 has a plurality of cavities 51 that may be axially arranged and a circumferentially extending and radially tapered or curved appendage 52. Each one of the plurality of the cavities 51 may extend spanwise through the turbine blade 20 and may be fluidly coupled to another one of the plurality of cavities 51 such that the main cooling circuit 50 may have an extended cooling circuit length that, in some cases, has a serpentine configuration. A fluid, such as coolant, may thus be directed through the main cooling circuit 50 to cool the turbine blade 20 by convection, conduction and/or impingement cooling.

The platform 30 is formed to define a platform cooling circuit 60 and a substantially radially extendible pathway 70. The platform cooling circuit 60 extends axially through the platform 30 and may include one or more platform cavities 61. The pathway 70 may be configured to be coupled to an end of the appendage 52 and to any one or more of the plurality of the cavities 51 of the main cooling circuit 50. That is, the pathway 70 may be provided at or near the axial location of the one or more of the plurality of the cavities 51 and the one or more of the platform cavities 61 to which the pathway 70 is coupled.

The appendage 52 is formed to define an extension of the main cooling circuit 50 and extends circumferentially from the main cooling circuit 50 and is radially tapered or curved. More particularly, the appendage 52 extends circumferentially from the one or more of the plurality of the cavities 51 to which the pathway 70 is to be coupled to. The pathway 70 is extendible substantially radially outwardly from a circumferential end 510 of the appendage 52 and to the platform cooling circuit 60, which is configured to be disposed radially outwardly from the circumferential end 510 of the main cooling circuit 50 when the turbine blade 20 and the platform 30 are assembled together. That is, the appendage 52 is extended to intersect with the pathway 70 at a location that is radially inward from or underneath any of the one or more of the platform cavities 61. As such, the pathway 70 can be disposed to fluidly communicate with the main cooling circuit 50 and the platform cooling circuit 60 simultaneously.

The radial tapering or curvature of the appendage 52 is configured to be distant or remote from the platform cooling circuit 60. That is, the appendage 52 may include a radially outward side 520 and a radially inward side 530. The radially outward side 520 is configured to be disposed radially proximate to the platform cooling circuit 60 and may be configured with relatively shallow tapering or curvature relative to an axial dimension of the turbomachine component 10. The radially inward side 530 is configured to be disposed radially remotely from the platform cooling circuit 60 and may be configured with relatively deep tapering or curvature relative to the axial dimension of the turbomachine component 10. With this construction, as fluid moves from the main cooling circuit 50 through the appendage 52, the fluid may be directed to flow smoothly into the platform cooling circuit 60.

In accordance with embodiments, the radially outward side 520 and the radially inward side 530 may each be generally straight, curved and/or angled. Respective ends of the radially outward side 520 and the radially inward side 530 may similarly be angular or curved relative to the surrounding structures.

In accordance with further embodiments, the pathway 70 and the platform cooling circuit 60 meet at an intersection 80. This intersection 80 may include angular or rounded edges. Also, the pathway 70 may be angled relative to a radial dimension of the turbomachine component 10. Where the platform cooling circuit 60 is itself curved and/or angled relative to a circumferential dimension of the turbomachine component 10, the intersection 80 and the possible angling of the pathway 70 may be provided in agreement with the curvature and/or angling of the platform cooling circuit 60.

Once the pathway 70 is formed in the platform 30, a plug 90 may be installed in a radially inward section of the pathway 70. This plug 90 may be configured to prevent coolant leakage from the pathway 70 and may be one or more of welded, brazed or mechanically fastened to the platform 30.

In accordance with another aspect of the invention, a method of assembling the turbomachine component 10 is provided. The method includes forming the turbine blade 20, as described above, such that the turbine blade 20 defines the main cooling circuit 50 as having at least the appendage 52 and forming the platform 30, as described above, with which the turbine blade 20 is to be assembled such that the platform 30 defines the platform cooling circuit 60. The method further includes forming by, e.g., casting or machining, the substantially radially extendible pathway 70 into the platform 30 such that the pathway 70 is configured to connect the main cooling circuit 50 and the platform cooling circuit 60 when the turbine blade 20 is assembled with the platform 30.

In accordance with embodiments, the method further includes assembling the turbine blade 20 with the platform 30. The casting or machining of the pathway 70 may be conducted prior to or subsequent to this assembling operation. In the former case, the casting or machining process may be simpler since the platform 30 may be a stand-alone component at the time. By contrast, in the latter case, the precise axial, circumferential and radial location of the pathway 70 may be easier to ascertain since the location of the appendage 52 relative to the platform 30 will already be known.

In accordance with further embodiments, each of the forming of the turbine blade 20 and the forming of the platform 30 may include, for example, casting processes and/or other similar processes, such as investment casting and molding processes. The casting or machining of the pathway 70 may be completed after the other forming processes and therefore allows for external location verification. The machining may include, for example, electro-dynamic machining (EDM) processes and/or other similar processes, such as mechanical machining and chemical or mechanical etching processes.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A turbomachine component, comprising:
a turbine blade, which is rotatable about a rotor of a turbine for power generation operations; and
a platform with which the turbine blade is to be assembled, the turbine blade being formed to define a main circuit having a circumferential appendage formed with radial tapering or curvature and extending circumferentially from the main circuit and the platform being formed to define:
a platform circuit, and
a substantially radially extendible pathway configured to be coupled to the appendage and to the platform circuit,
wherein the appendage comprises a radially outward side, which is configured to be disposed proximate to the platform circuit, and which is configured with shallow tapering or curvature and a radially inward side, which is distant from the platform circuit, and which is configured with deep tapering or curvature, the deep tapering or curvature of the radially inward side being deeper than the shallow tapering or curvature of the radially outwardly side.
2. The turbomachine component according to claim 1, wherein the pathway is extendible substantially radially outwardly from an end of the appendage to the platform circuit.

3. The turbomachine component according to claim 1, wherein the radial tapering or curvature is distant from the platform circuit.

4. The turbomachine component according to claim 1, wherein an intersection of the pathway and the platform circuit comprises rounded edges.

5. A turbomachine component, comprising:
a turbine blade, which is rotatable about a rotor of a turbine for power generation operations;
a platform with which the turbine blade is to be assembled, the turbine blade being formed to define a main circuit having a circumferential appendage and the platform being formed to define a platform circuit and a substantially radially extendible pathway configured to be coupled to the appendage and to the platform circuit; and
a plug to prevent leakage from a radially inward section of the pathway, an entirety of the plug being disposed radially inwardly from a radially inward-most portion of the pathway.

6. The turbomachine component according to claim 5, wherein the plug is one or more of welded, brazed or mechanically fastened proximate to the platform.

7. A turbomachine component, comprising:
a turbine blade, including an airfoil and a root, which is rotatable about a rotor of a turbine for power generation operations; and
a platform with which the root of the turbine blade is to be assembled,
at least the airfoil of the turbine blade being formed to define a main circuit having a plurality of cavities and a circumferentially extending and radially tapered or curved appendage comprising radially inward and outward sides of which only the radially inward side has tapering or curvature relative to an axial dimension of the turbomachine component,
the platform being formed to define a platform circuit and a substantially radially extendible pathway configured to be coupled to an end of the appendage and any one or more of the plurality of the cavities of the platform circuit.

8. A method of connecting circuits of a turbomachine component, comprising:
casting a turbine blade, which is rotatable about a rotor of a turbine for power generation operations, such that the turbine blade defines a main circuit having an appendage;
casting a platform with which the turbine blade is to be assembled such that the platform defines a platform circuit; and
following the casting of the turbine blade and the platform, machining a substantially radially extendible pathway into the casted platform such that the machined pathway is configured to connect the main circuit and the platform circuit when the casted turbine blade is assembled with the casted platform.

9. The method according to claim 8, further comprising assembling the casted turbine blade with the casted platform, wherein the machining of the pathway is conducted prior to or subsequent to the assembling.

10. The method according to claim 8, wherein the casting of the turbine blade comprises casting the turbine blade such that the appendage extends circumferentially from the main circuit and is formed with radial tapering or curvature.

11. The method according to claim 10, wherein the machining of the pathway comprises machining the pathway to be extendible substantially radially outwardly from an end of the appendage to the platform circuit.

12. The method according to claim 10, wherein the casting of the turbine blade comprises casting the turbine blade such that the radial tapering or curvature is distant from the platform circuit.

13. The method according to claim 8, wherein the machining of the pathway comprises machining rounded edges at an intersection of the pathway and the platform circuit.

14. A method of connecting circuits of a turbomachine component, comprising:
forming a turbine blade, which is rotatable about a rotor of a turbine for power generation operations, such that the turbine blade defines a main circuit having an appendage;
forming a platform with which the turbine blade is to be assembled such that the platform defines a platform circuit;
following the forming of the turbine blade and the platform, forming a substantially radially extendible pathway in the platform such that the pathway is configured to connect the main circuit and the platform circuit when the turbine blade is assembled with the platform; and
plugging the pathway.

15. The method according to claim 14, wherein the plugging comprises one or more of welding, brazing or mechanical fastening of a plug proximate to the platform.

* * * * *